United States Patent
Borchers et al.

(10) Patent No.: US 6,491,260 B2
(45) Date of Patent: Dec. 10, 2002

(54) NOISE REDUCING VORTEX GENERATORS ON AIRCRAFT WING CONTROL SURFACES

(75) Inventors: Ingo Borchers, Uhldingen-Muehlhofen (DE); Roger Drobietz, Salem-Grasbeuren (DE); Michael Gruenewald, Hoehenkirchen (DE); Knut Mau, Hamburg (DE); Johann Reichenberger, Ainring (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/841,699

(22) Filed: Apr. 24, 2001

(65) Prior Publication Data

US 2001/0032907 A1 Oct. 25, 2001

(30) Foreign Application Priority Data

Apr. 25, 2000 (DE) .......................... 100 20 177

(51) Int. Cl.$^7$ ............................... B64C 23/06
(52) U.S. Cl. ................................... 244/199
(58) Field of Search ................ 244/198, 199, 244/212, 213, 214

(56) References Cited

U.S. PATENT DOCUMENTS

| | | |
|---|---|---|
| 2,925,232 A | 2/1960 | Murray et al. |
| 3,578,264 A * | 5/1971 | Kuethe ................. 244/41 |
| 3,596,854 A | 8/1971 | Haney, Jr. |
| 3,881,669 A | 5/1975 | Lessen |
| 3,997,132 A | 12/1976 | Erwin |
| 4,039,161 A | 8/1977 | Bauer |
| 4,591,113 A | 5/1986 | Mabey |
| 4,739,957 A | 4/1988 | Vess et al. |
| 4,836,473 A * | 6/1989 | Aulehla et al. ............. 244/130 |
| 5,058,837 A | 10/1991 | Wheeler |
| 5,253,828 A | 10/1993 | Cox |
| 5,749,546 A * | 5/1998 | Blackner et al. ............ 244/215 |
| 5,772,155 A * | 6/1998 | Nowak ........................ 244/199 |
| 5,788,191 A | 8/1998 | Wake et al. |
| 5,983,944 A * | 11/1999 | Niv ............................. 137/831 |
| 6,042,059 A | 3/2000 | Bilanin et al. |
| 6,082,679 A | 7/2000 | Crouch et al. |
| 6,152,404 A * | 11/2000 | Flaig et al. ................. 244/199 |

FOREIGN PATENT DOCUMENTS

| | | |
|---|---|---|
| DE | 19909190 | 9/2000 |
| EP | 0315563 | 5/1989 |
| GB | 2051706 | 1/1981 |
| JP | 401285492 | 11/1989 |
| WO | WO 99/00297 | 1/1999 |

* cited by examiner

Primary Examiner—Peter M. Poon
Assistant Examiner—Kevin Jakel
(74) Attorney, Agent, or Firm—W. F. Fasse; W. G. Fasse

(57) ABSTRACT

Vortex generators are arranged on the edges of aircraft wing control surfaces to generate smaller vortices that weaken the main vortex that would otherwise be generated at these areas, and thereby reduce the aerodynamic generation of noise. Each vortex generator includes plural elongated elements in the form of rigid rods or flexible bristles protruding laterally outwardly from the respective edge of the control surface. The vortex generators are preferably arranged on the inboard and outboard edges of high lift flaps and slats.

17 Claims, 1 Drawing Sheet

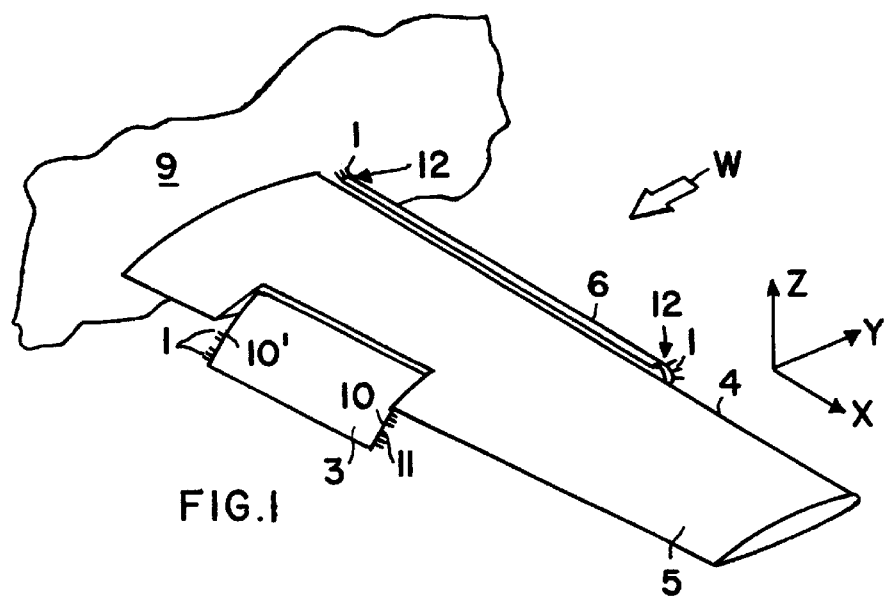
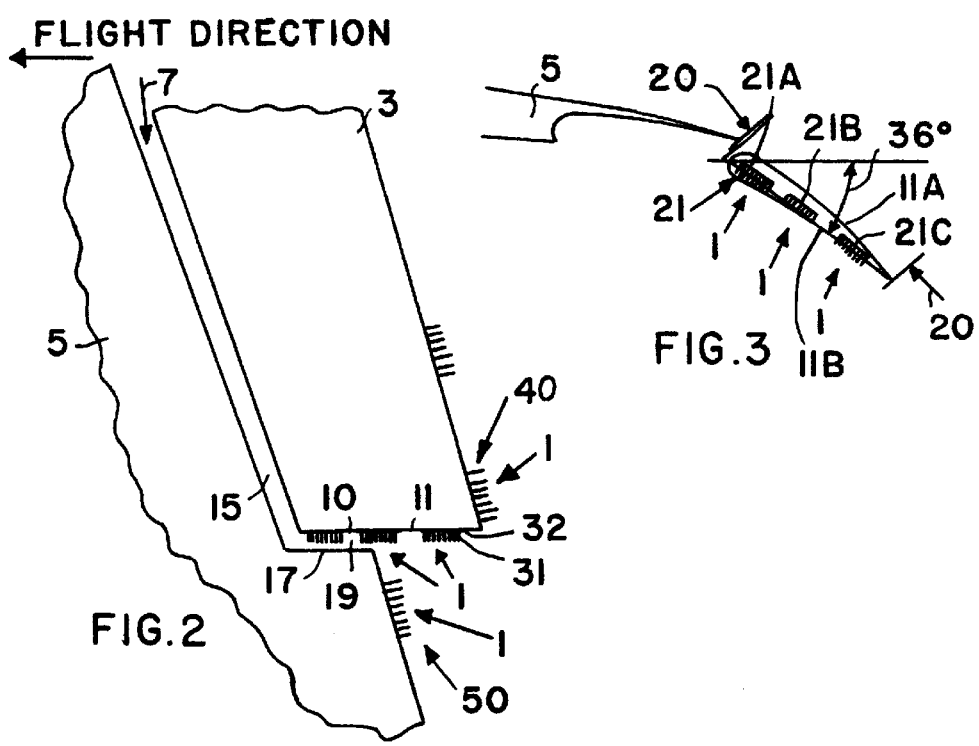

NOISE REDUCING VORTEX GENERATORS ON AIRCRAFT WING CONTROL SURFACES

CROSS-REFERENCE TO RELATED APPLICATION

The present application is related to U.S. patent application Ser. No. 09/770,763, filed on Jan. 25, 2001, of the same assignee as the present application.

PRIORITY CLAIM

This application is based on and claims the priority under 35 U.S.C. §119 of German Patent Application 100 20 177.6, filed on Apr. 25, 2000, the entire disclosure of which is incorporated herein by reference.

1. Field of the Invention

The invention relates to an arrangement for reducing the noise generated by the aerodynamic flow of air over the lifting wings of aircraft, and particularly along the control surfaces such as high lift flaps or slats of such wings.

2. Background Information

A significant portion of the total noise generated by an aircraft in flight is caused by the flow of air along the external contours of the aircraft. A large part of this aerodynamically generated noise is contributed by the flow of air over or along control surfaces of the aircraft. The aerodynamically generated noise is especially significant and causes a disturbing influence in the surrounding environment, particularly in the landing approach of an aircraft, because in the landing configuration, the extended high lift flaps generate additional noise, and this noise is generated and radiated into the environment at a relatively low flight altitude. For this reason, noise level regulations are becoming ever stricter, especially in the vicinity of major airports.

Attempts have been made in the prior art to reduce the aerodynamic generation of noise by aircraft in flight. For example, it is conventionally known to arrange flow stabilizers in the form of winglets on the wing tips or the like, in order to stabilize the air flow, with a hope of reducing the noise in addition to other effects. However, in actual practice, the noise reducing effect of such winglets is rather minimal.

SUMMARY OF THE INVENTION

In view of the above it is an object of the invention to provide an arrangement that can effectively reduce the noise generated from the extended control surfaces of an aircraft in flight. The inventive arrangement shall be simple in structure and installation, so that it can be installed in new aircraft and easily retrofitted on existing aircraft. The inventive structure shall be economical in cost, and light in weight, so that it does not cause disadvantages in the manufacturing and operation of the aircraft. Furthermore, the inventive arrangement shall not significantly detract from the proper aerodynamic characteristics of the control surfaces. The invention further aims to avoid or overcome the disadvantages of the prior art, and to achieve additional advantages as apparent from the present specification.

The above objects have been achieved according to the invention in an arrangement for reducing noise generated on the lifting wings of an aircraft, and particularly on control surfaces such as high lift flaps, slats, spoilers, ailerons, rudders, and the like. According to the invention, the arrangement includes at least one vortex generator arranged on the outboard and/or inboard ends of the respective control surface. Particularly, the vortex generator may be arranged on a profile side surface or along an upper side edge or a lower side edge of such a profile side surface, or directly on an end line edge at the outboard or inboard ends of the respective control surface. Thereby the vortex generator extends over at least a portion of the profile depth or chord length of the respective control surface at the inboard or outboard end thereof. As further features of the invention, additional vortex generators may be arranged on the trailing edge of a flap, or on the trailing edge of the lifting wing itself. The vortex generator preferably comprises elongated elements that protrude outwardly away from the respective outboard or inboard edge of the control surface, and that may form a rigid comb-like structure, or a flexible brush-like structure.

In a preferred embodiment of the invention, the vortex generators are arranged on the inner and/or outer profile end surfaces of a control surface and particularly of a flap. These vortex generators influence the overall vortex system generated by an aircraft during flight. This vortex system at issue particularly includes a so-called main vortex, which is a relatively large vortex that is generated from and along the gap or discontinuity between the main wing and the control surface or surfaces. This main vortex involves a relatively undisturbed, large-volume vortex flow of air, which radiates a significant amount of noise into the far field of the surrounding environment.

In the inventive arrangement, the relatively small vortex generators arranged along the edges of the control surface purposely generate a greater number of relatively small individual vortices, which break-up and take energy away from the main vortex and thereby reduce the strength of the main vortex without significantly reducing the aerodynamic effect of the control surfaces and particularly the lift effect of the high lift flaps. The noise generated and radiated by the interaction of the various smaller vortex systems with the main surfaces and the surfaces or edges of the flap is significantly less than the noise generated by the undisturbed larger volume vortex system that would otherwise arise without the inventive vortex generators.

A substantial advantage of the invention is that relatively inexpensive and simple measures, with a relatively low construction and installation effort, achieve a significant noise reduction. In this context it is further advantageous, that the vortex generators according to the invention are easily adaptable with little effort, based on various factors such as the wing geometry, selected flight conditions, and the like, so that an efficient noise reduction can be achieved in a very simple and economical manner for various applications. A further advantage of the invention is that the subject vortex generators are rather light in weight, and in general hardly have any negative influence on the overall capacity or operation of the aircraft.

BRIEF DESCRIPTION OF THE DRAWINGS

In order that the invention may be clearly understood, it will now be described in connection with example embodiments, with reference to the accompanying drawings, wherein:

FIG. 1 is a schematic perspective view of an aircraft wing with a landing flap and a high lift slat extended therefrom, as representative control surfaces equipped with arrangements of vortex generators according to the invention;

FIG. 2 is a schematic top view of a portion of the wing with the high lift flap according to FIG. 1, in a partially extended position of the flap; and FIG. 3 is a partial side view of an extended flap as a control surface with three vortex generators arranged on a side surface thereof.

DETAILED DESCRIPTION OF PREFERRED EXAMPLE EMBODIMENTS AND OF THE BEST MODE OF THE INVENTION

The inventive arrangement for reducing aerodynamic noise, especially by breaking up or interrupting a large main vortex flow, includes a plurality of vortex generators 1 arranged on a control surface, such as a high lift flap 3, for example, of a lifting wing 5 of an aircraft. For spatial reference, a Cartesian coordinate system of X, Y and Z-directions is indicated in FIG. 1, whereby the X-direction corresponds generally to the wing longitudinal direction or wingspan direction, and the Y-axis is perpendicular to the wing span direction, generally forward in the flight direction. The relative wind W approaching the leading edge 4 of the wing is also indicated. The inventive arrangement of vortex generators 1 is illustrated and will be described in connection with a high lift slat 6 and especially a high lift flap 3 as representative examples of control surfaces. It should be understood, however, that the pertinent control surfaces that may be equipped with vortex generators 1 according to the invention include all manner of control surfaces on an aircraft, for example landing flaps, slats, spoilers, rudders, ailerons, elevators, and the like.

In the particular illustrated embodiment, the control surface shown in FIG. 1 is an extendible landing flap 3 which extends along at least a portion of the length of the wing 5. With such an extended landing flap 3, a vortex will typically be generated during flight, in the area of the transition 7 from the wing 5 to the landing flap 3. This transition 7 typically comprises a discontinuity, non-uniformity or curvature variation of the outer contour of the wing and flap, or a gap between the wing and the flap. A main vortex generated at this location extends over the region of the outboard end 10, i.e. the end of the flap 3 protruding outwardly away from the aircraft fuselage 9 (merely indicated schematically), or particularly over the profile side surface 3 at the outboard end 10 of the landing flap 3. That also applies for the inboard end 10' of the flap 3 facing toward the fuselage 9. Generally in this specification, the term "lateral end" means an end of a control surface extending crosswise relative to the length extension of the control surface, such as the inboard and outboard ends of a flap or slat, or the upper and lower ends of a rudder.

The outboard end 10 of the flap 3 typically comprises an upper side edge 11A and a lower side edge 11B, as well as a profile side surface 13 bounded between the upper and lower side edges 11A and 11B. This is visible in the side view of FIG. 3, and also applies to the inboard end 10'. As an alternative, the end 10 can terminate in a distinct end line edge 11 as a terminal edge of the flap. In this specification, the term "lateral end line edge" encompasses both the end line edge 11 as well as the upper and lower side edges 11A and 11B.

In the embodiment illustrated in FIG. 1, the landing flap 3 is received to a variable extent (depending on its momentary extension position) in a recess or cut-out notch 15 in the wing 5, so that an edge gap 19 is formed between the end line edge 11 or the profile side surface 13 of the landing flap 3 on the one hand, and a side edge 17 of the recess or cut-out notch 15 of the wing 5 facing opposite the end of the flap 3 on the other hand. This gap 19 is especially shown in FIG. 2, where it is seen that this gap 19 accommodates the vortex generators 1 according to the invention, as will be discussed next.

In the inventive arrangement, a plurality of the vortex generators 1 are arranged on the outboard end 10 and/or the inboard end 10' of the flap 3. Preferably, these vortex generators 1 are arranged on the inner or central portion of the profile side surface 13 directly at the outboard end of the flap 3, i.e. between the upper side edge 11A and the lower side edge 11B. Alternatively, the vortex generators 1 may be arranged directly on one or both of the upper and lower side edges 11A and 11B.

The present inventive arrangement of vortex generators 1 is not limited to the landing flaps 3, but instead such vortex generators 1 may generally be arranged on the edges of any aerodynamic control surfaces, including spoilers, ailerons, slats, rudders, elevators, etc. FIG. 1 schematically shows a high lift slat 6 extended from the leading edge 4 of the wing 5. Vortex generators 1 may similarly be arranged on the inboard and outboard ends 12 of the slat 6, as schematically shown in FIG. 1. The vortex generators 1 may additionally or alternatively be arranged on the trailing edge of any respective control surface as shown at 40, or on the trailing edge of the main wing 5 as shown at 50. The vortex generators 1 at all of these locations provide noise-reducing advantages.

The vortex generator or generators 1 is or are arranged as one or more vortex generator groups or sections 21, which extend at least over a portion of the total profile depth or chord length 20 of the respective control surface such as the landing flap 3. If the vortex generators 1 are arranged in several separate groups or sections 21A, 21B, 21C, these groups respectively extend over several individual portions of the total profile depth or chord length 20, with respective spaces therebetween at which no vortex generators are arranged. The portion or portions of the chord length 20 that are provided with vortex generators 1 extend over at least ⅕ and preferably at least ⅔ of the chord length 20. It should be understood that the singular term "vortex generator" can be regarded to include only a single vortex generator section 21 or a plurality of vortex generator sections 21A, 21B, 21C. On the other hand, the plural vortex generator sections 21A, 21B, 21C can alternatively be regarded as plural vortex generators.

The vortex generators 1 preferably comprise a plurality of elongated elements 31 grouped together. Each individual elongated element 31 is essentially a bristle or rod, which may basically have any desired cross-sectional shape, such as a circular, oval, square, rectangular, or free-form sectional shape. This cross-section may be uniform or may vary along the length of the respective elongated element 31. In other words, each elongated element 31 may have a constant cross-sectional dimension, or may taper along its length, for example. The elongated elements 31 may each be flexible so that the overall vortex generator arrangement essentially has the form of a brush made up of flexible bristles, or the elements 31 may be rigid so that the overall vortex generator arrangement has a comb-like embodiment made up of rigid rods. Such a comb-like arrangement is shown in FIGS. 1, 2 and 3.

The individual elongated elements 31 may be arranged along a single row, or in plural rows in each vortex generator section 21, 21A, 21B, 21C. The elongated elements 31 may be made of metal, plastic, fiber-reinforced composite, or any other suitable material known in the field of aircraft construction, and may be secured to the structure of the respective control surface by adhesive bonding, riveting, or by fasteners such as screws or the like. Preferably, the vortex generator sections 21, 21A, 21B and 21C are each formed of a row of the elongated elements 31, or a plurality of rows of these elements 31, joined to each other by a base member 32 from which the elongated elements 31 protrude. The base member 32 is then secured to the respective edge or end surface of the control surface. Alternatively, each elongated element 31 may be secured directly to the lateral end of the respective control surface, i.e. without a base member 32. The sections 21, 21A, 21B and 21C may be arranged spaced apart from each other along a single row in the chord direction as shown in FIGS. 2 and 3, or may be arranged along plural parallel rows. The length of each of the elongated elements 31 is e.g. in the range from 5 to 100 mm, and preferably 5 to 15 mm.

The elongated elements 31 generally protrude laterally outwardly from the lateral end 10 of the respective control surface such as the high lift flap 3, and particularly at a slight angle relative to the lengthwise direction of the flap 3 itself, as shown in FIG. 2. For example, the elements 31 extend substantially perpendicularly to the flight direction, i.e. perpendicularly to the relative wind W, which may also be perpendicular to the profile side surface 13. Alternatively, the elements 31 may extend along or parallel to the lengthwise extension direction of the flap 3, or they may extend in the flight direction along the Y-direction, for example if they extend from the trailing edges of the control surfaces or the wing itself.

The configuration, size, material, number, and arrangement of the elongated elements 31 in each vortex generator section 21, 21A, 21B or 21C, as well as the arrangement of these sections or vortex generators 1, is essentially dependent on the geometry of the wing and the respective control surface such as the flap 3 to which the vortex generators 1 are to be mounted. Other factors to be taken into account are the relevant angle of attack, flap settings, and flight speeds of the respective aircraft. Generally, a rather large number of the individual elongated elements 31 is used, for example at least 10 or at least 20 or more, on each lateral end of the respective control surface. In any event, the particular details of the vortex generators 1 can be determined by aerodynamic experiments to adapt the vortex generators 1 optimally to the respective application at hand, in view of the prevailing aerodynamic conditions on the respective wing, so as to achieve an optimum noise reduction.

The above discussion described the formation of a vortex system in connection with the landing flap 3 which is a special form of high lift flap. On the other hand, the vortex system generated by other types of flaps, such as spoilers for example, has different characteristics than the above described vortex system. Nonetheless, the vortices generated in connection with such other flaps also extend over a side edge of the respective flap, so that the inventive arrangement of vortex generators 1 can also be advantageously provided on the end or edge portion of such other flaps, and particularly on an end region of the flap extending crosswise or perpendicularly to the X-axis or the length-wise direction of the flaps. Notwithstanding such considerations, the inventive vortex generators 1 may also or alternatively be arranged on the other above-mentioned areas of the flaps or essentially any control surfaces, with an advantageous noise-reducing effect.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft including a fuselage, a wing, and control surfaces selected from the group consisting of a high-lift flap, a slat, a spoiler, an aileron, an elevator, and a rudder, an improvement for reducing aerodynamically generated noise of air flowing over said aircraft, wherein:
   said improvement comprises a vortex generator arranged on a lateral end of said high-lift flap,
   said high-lift flap extends in a flap length direction along said wing and has an outboard end facing away from said fuselage and an inboard end facing toward said fuselage,
   said lateral end is said outboard end or said inboard end,
   said lateral end includes a profile side surface bounded between an upper side edge and a lower side edge of said high-lift flap, and
   said vortex generator is arranged on said profile side surface between said upper side edge and said lower side edge, and extends along at least a portion of a chord length of said high-lift flap.

2. In an aircraft including a fuselage, a wing, and control surfaces selected from the group consisting of a high-lift flap, a slat, a spoiler, an aileron, an elevator, and a rudder, an improvement for reducing aerodynamically generated noise of air flowing over said aircraft, wherein:
   said improvement comprises a vortex generator arranged on a lateral end of said high-lift flap,
   said high-lift flap extends in a flap length direction along said wing and has an outboard end facing away from said fuselage and an inboard end facing toward said fuselage,
   said lateral end is said outboard end or said inboard end,
   said lateral end includes a lateral end line edge at which said high-lift flap terminates, and
   said vortex generator is arranged on and extending along said lateral end line edge along at least a portion of a chord length of said high-lift flap.

3. In an aircraft including a fuselage, a wing, and control surfaces selected from the group consisting of a high-lift flap, a slat, a spoiler, an aileron, an elevator, and a rudder, an improvement for reducing aerodynamically generated noise of air flowing over said aircraft, wherein:
   said improvement comprises a vortex generator arranged on a lateral end of said slat,
   said slat extends in a slat length direction along said wing and has an outboard end facing away from said fuselage and an inboard end facing toward said fuselage,
   said lateral end is said outboard end or said inboard end,
   said lateral end includes a lateral end line edge at which said slat terminates, and
   said vortex generator is arranged on and extending along said lateral end line edge along at least a portion of a chord length of said slat.

4. In an aircraft including a fuselage, a wing, and control surfaces selected from the group consisting of a high-lift flap, a slat, a spoiler, an aileron, an elevator, and a rudder, an improvement for reducing aerodynamically generated noise of air flowing over said aircraft, wherein said improvement comprises a first vortex generator arranged on a lateral end of one of said control surfaces, and an additional vortex generator arranged on a trailing edge of at least one of said wing and said high-lift flap.

5. The improvement in the aircraft according to claim 4, wherein said additional vortex generator is arranged on said trailing edge of said high-lift flap.

6. The improvement in the aircraft according to claim 4, wherein said additional vortex generator is arranged on said trailing edge of said wing.

7. The improvement in the aircraft according to claim 4, wherein said one of said control surfaces on which said first vortex generator is arranged is said slat, said slat extends in a slat length direction along said wing and has an outboard end facing away from said fuselage and an inboard end facing toward said fuselage, said lateral end is said outboard end or said inboard end, said lateral end includes a profile side surface bounded between an upper side edge and a lower side edge of said slat, and said first vortex generator is arranged on said profile side surface between said upper side edge and said lower side edge and extends along at least a portion of a chord length of said slat.

8. The improvement in the aircraft according to claim 4, wherein said one of said control surfaces on which said first vortex generator is arranged is said spoiler.

9. The improvement in the aircraft according to claim 4, wherein said one of said control surfaces on which said first vortex generator is arranged is said aileron.

10. In an aircraft including a fuselage, a wing, and control surfaces selected from the group consisting of a high-lift flap, a slat, a spoiler, an aileron, an elevator, and a rudder, an improvement for reducing aerodynamically generated noise of air flowing over said aircraft, wherein said improvement comprises a vortex generator arranged on a lateral end of one of said control surfaces, and wherein said vortex generator comprises a plurality of vortex generator sections arranged separately and spaced apart from one another on said lateral end.

11. In an aircraft including a fuselage, a wing, and control surfaces selected from the group consisting of a high-lift flap, a slat, a spoiler, an aileron, an elevator, and a rudder, an improvement for reducing aerodynamically generated noise of air flowing over said aircraft, wherein said improvement comprises a vortex generator arranged on a lateral end of one of said control surfaces, and wherein said vortex generator comprises a plurality of elongated elements protruding outwardly away from said lateral end.

12. The improvement in the aircraft according to claim 11, wherein said vortex generator is configured, arranged and adapted to disrupt the formation of a single large vortex of air flowing over said lateral end.

13. The improvement in the aircraft according to claim 11, wherein said vortex generator further comprises a base that is secured to said lateral end, and said elongated elements protrude outwardly from said base.

14. The improvement in the aircraft according to claim 11, wherein said elongated elements are rigid rods.

15. The improvement in the aircraft according to claim 11, wherein said elongated elements are flexible bristles.

16. The improvement in the aircraft according to claim 11, wherein said elongated elements have an outwardly protruding length in a range from 5 to 15 mm.

17. The improvement in the aircraft according to claim 11, wherein said vortex generator is arranged on at least one portion of said lateral end totaling at least two thirds of a chord length of said one of said control surfaces.

* * * * *